United States Patent [19]

Page et al.

[11] Patent Number: 4,849,893

[45] Date of Patent: Jul. 18, 1989

[54] COMPUTER CONTROL SYSTEM

[75] Inventors: Steven J. Page; Derek P. M. Wills; Barry M. Lowe; John G. Brown; Neil J. Curtis; Adrian J. Hall; Kim P. Holmes, all of Brough, England

[73] Assignee: British Aerospace Public Limited Company, London, England

[21] Appl. No.: 263,975

[22] Filed: Oct. 26, 1988

Related U.S. Application Data

[63] Continuation of Ser. No. 149,925, Jan. 29, 1988, abandoned, which is a continuation of Ser. No. 843,625, Mar. 25, 1986, abandoned.

[30] Foreign Application Priority Data

Mar. 25, 1985 [GB] United Kingdom ............... 8507680

[51] Int. Cl.$^4$ ............................................. G06F 15/50
[52] U.S. Cl. ................................... 364/434; 364/550; 364/131
[58] Field of Search ............... 364/424, 184, 187, 434, 364/200, 550; 371/9, 68

[56] References Cited

U.S. PATENT DOCUMENTS

| | | | |
|---|---|---|---|
| 4,101,958 | 7/1978 | Patterson et al. | 364/424 X |
| 4,130,241 | 12/1978 | Meredith et al. | 371/68 |
| 4,217,486 | 8/1980 | Tawfik et al. | 371/68 |
| 4,327,437 | 4/1982 | Gelderloos | 371/68 |
| 4,356,546 | 10/1982 | Whiteside et al. | 364/200 |
| 4,472,780 | 9/1984 | Chenoweth et al. | 364/434 |
| 4,622,667 | 11/1986 | Yount | 371/9 |
| 4,644,538 | 2/1987 | Cooper et al. | 371/9 |

Primary Examiner—Parshotam S. Lall
Assistant Examiner—Thomas G. Black
Attorney, Agent, or Firm—Cushman, Darby & Cushman

[57] ABSTRACT

A computer control system, especially a flight control computer system, comprises a series of computer modules operating in parallel and asynchronously to carry out respective parts of an overall control algorithm for a series of items to be controlled, each computer module having a data transmission port connected via a broadcast line to a respective input port of each other computer module so that communication between modules is achieved by any of the modules broadcasting asynchronous data messages onto its broadcast line for the messages to be received by any other modules which require them.

2 Claims, 18 Drawing Sheets

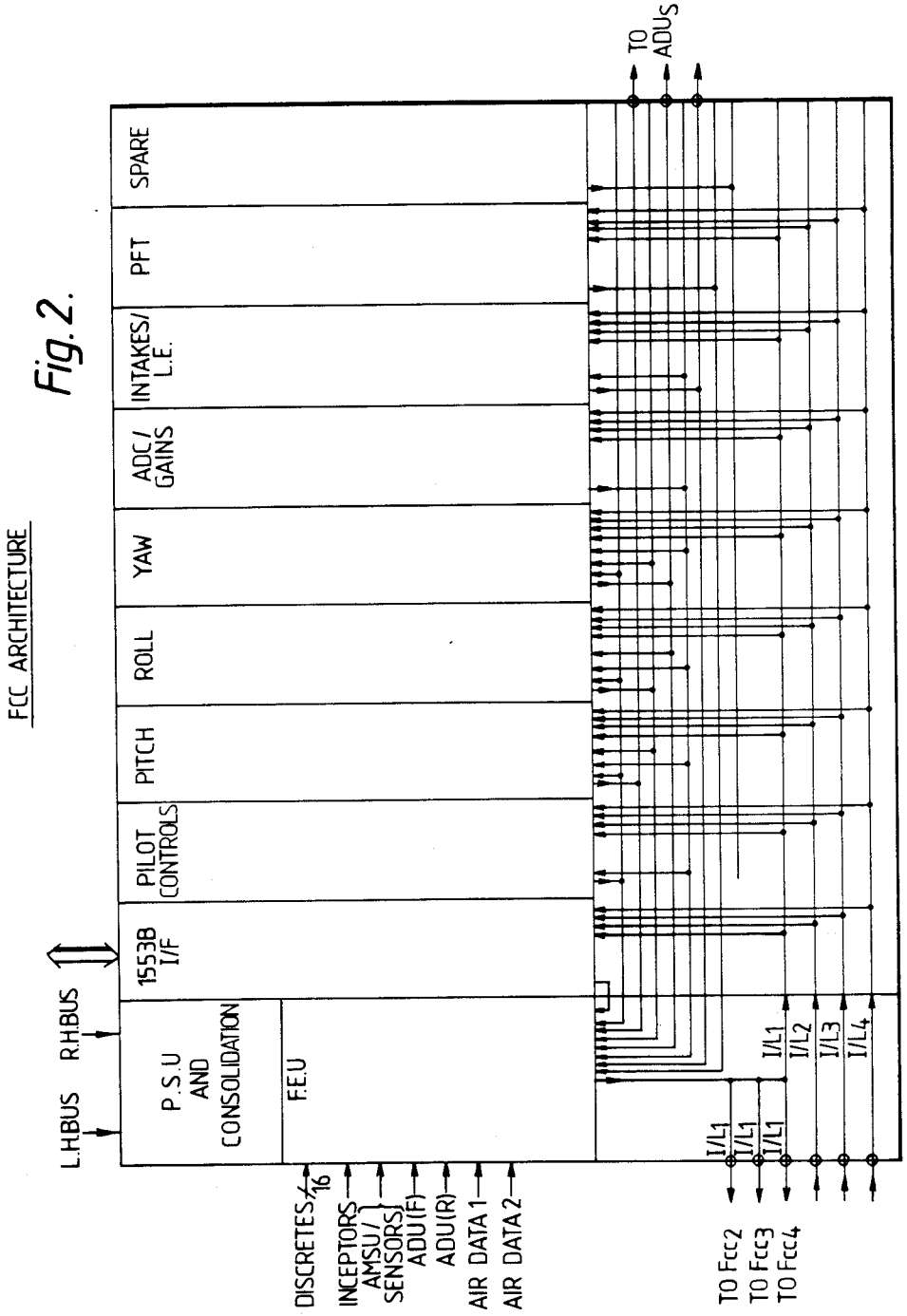
Fig. 2. FCC ARCHITECTURE

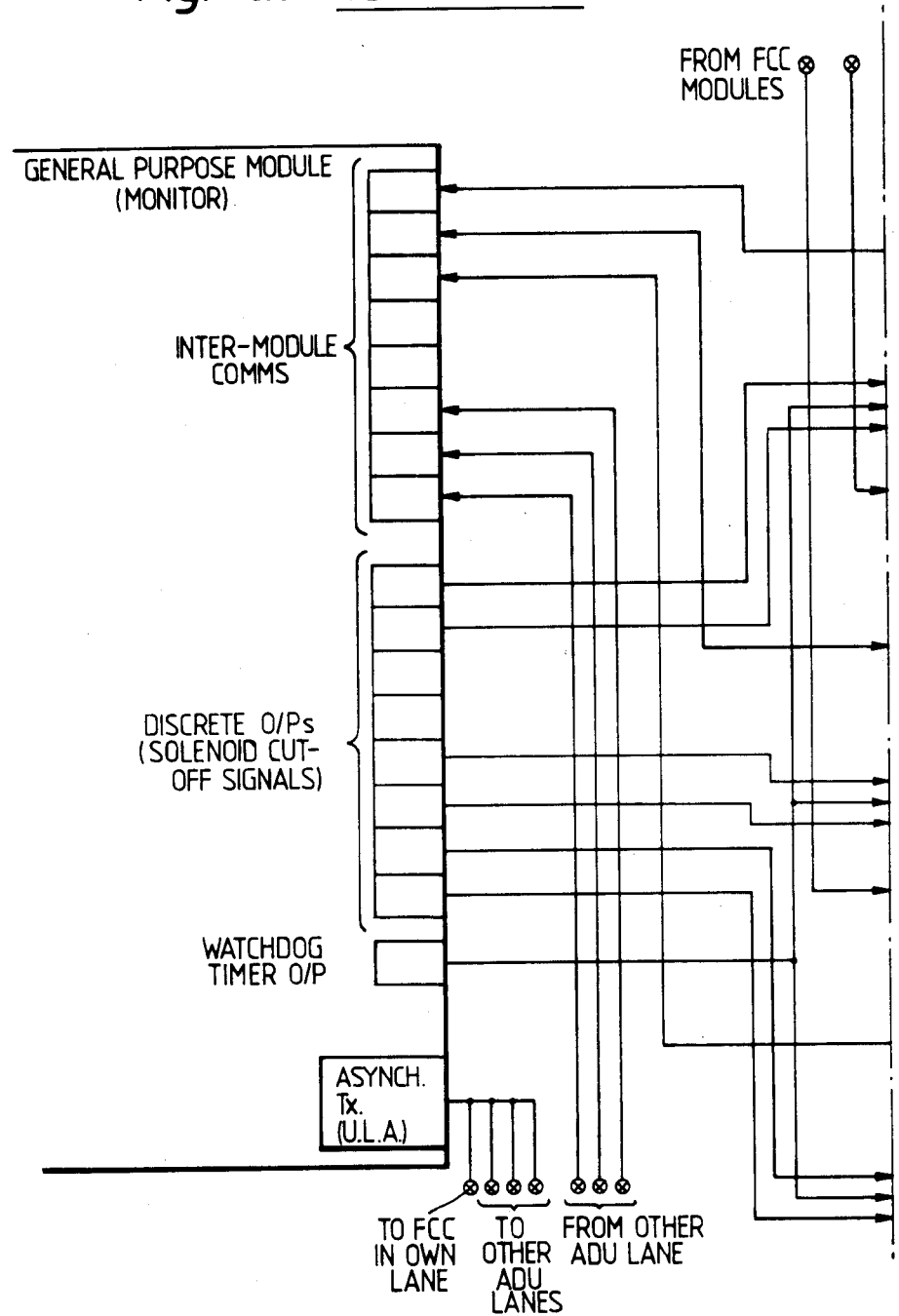
Fig. 3a. ADU ARCHITECTURE

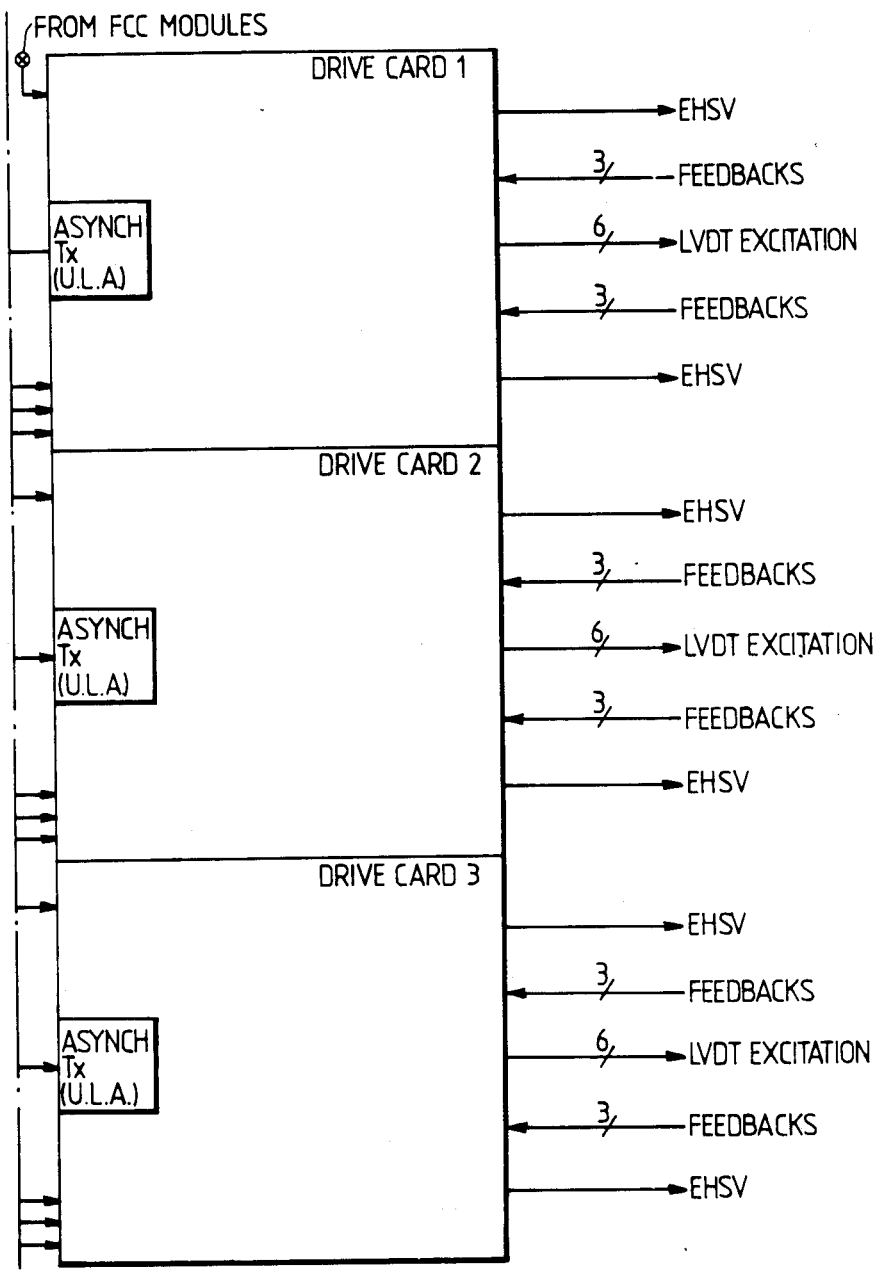
Fig.3b. ADU ARCHITECTURE

Fig.4. FRONT END UNIT

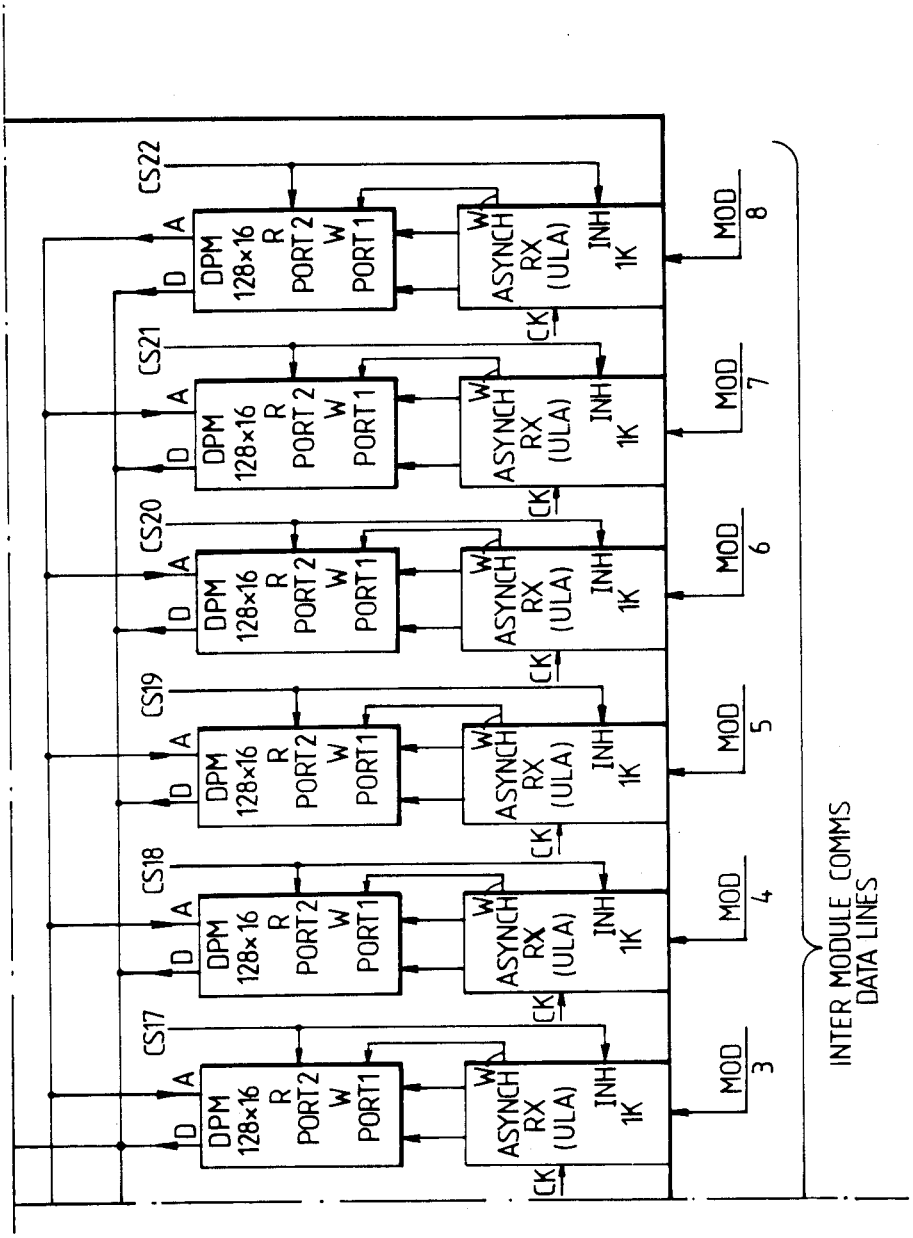

GENERAL PURPOSE MODULE BLOCK SCHEMATIC

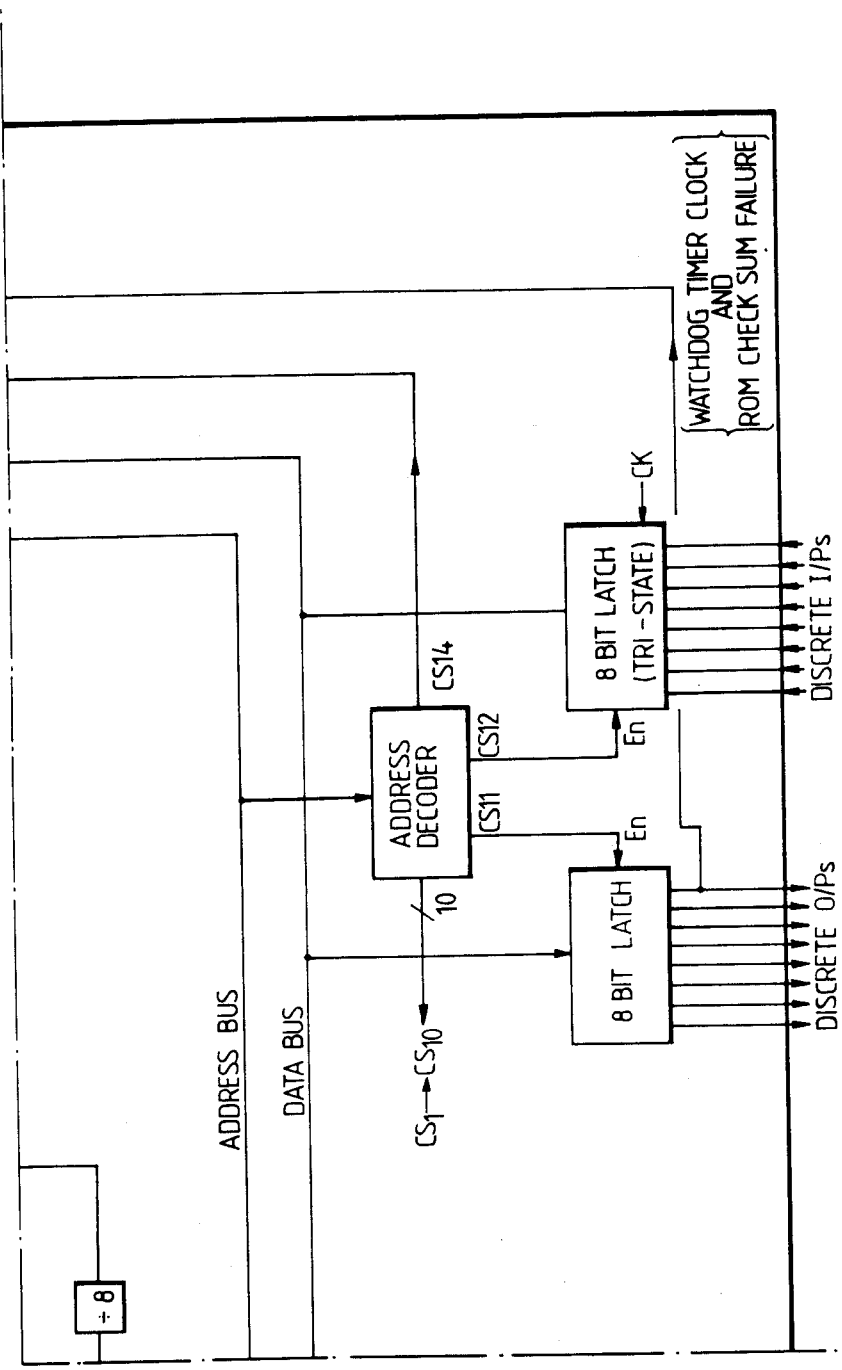

DATABUS MODULE

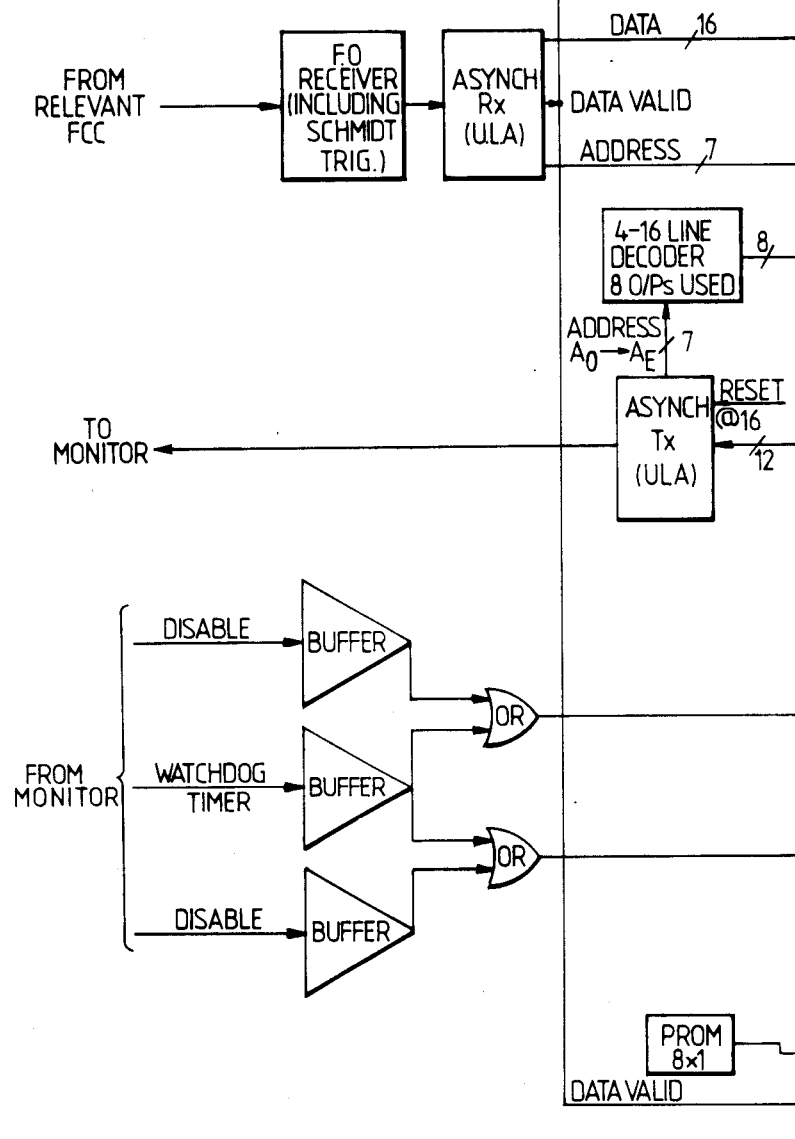

COMPUTER CONTROL SYSTEM

This is a continuation of application Ser. No. 149,925, filed Jan. 29, 1988, which was abandoned upon the filing hereof, which was a continuation of Ser. No. 843,625, filed Mar. 25, 1986, now abandoned.

BACKGROUND OF THE INVENTION

This invention relates to computer control systems, and more particularly, but not exclusively, to flight control computers for aircraft.

SUMMARY OF THE INVENTION

According to one aspect of the invention, there is provided a computer control system for controlling a plurality of actuators, for example a series of flight control actuators on board an aircraft, the computer control system comprising a plurality of actuator drive and monitoring units for forming signals for controlling the actuators and for monitoring the operation of the actuators, and a main computing section connected to receive monitoring information from, and to control the operation of, the actuator drive and monitoring units, the main computing section comprising a plurality of computer modules each connected so as to receive and sample asynchronously identical data from at least one of a plurality of sensors, computers, inceptors and switches and operable to share tasks according to work load and task priority, to collectively perform respective control law functions associated with the proper control of the actuators, for example aircraft attitude calculations such as pitch, roll and yaw calculations, and to provide control surface position demand signals to the actuator drive and monitoring units, each such module comprising a data transmission unit connected to a respective serial data broadcasting line which is in turn connected to a respective data receiving unit in each other module, whereby communication between modules is achieved by any of the modules broadcasting asynchronous digital data messages onto its data broadcasting line for this data message to be received by any other module which requires it.

BRIEF DESCRIPTION OF THE DRAWINGS

Further aspects of the invention, and advantageous and preferred features of the invention will appear in the following description of an exemplary embodiment of the invention, the description making reference by way of example to the accompanying drawings, in which:

FIG. 2 is an embodiment of a flight control computer of the FIG. 1 system, FIGS. 3a and 3b are a block diagram of an actuator drive and monitoring unit used in the FIG. 1 system, FIGS. 4a–4d are a simplified circuit diagram of an interface unit used in the FIG. 2 computer, FIGS. 7a–7c are a simplified circuit diagram of an actuator drive module used in the FIG. 2 computer.

DETAILED DESCRIPTION OF THE PREFERRED EMBODIMENT

Figure 1:
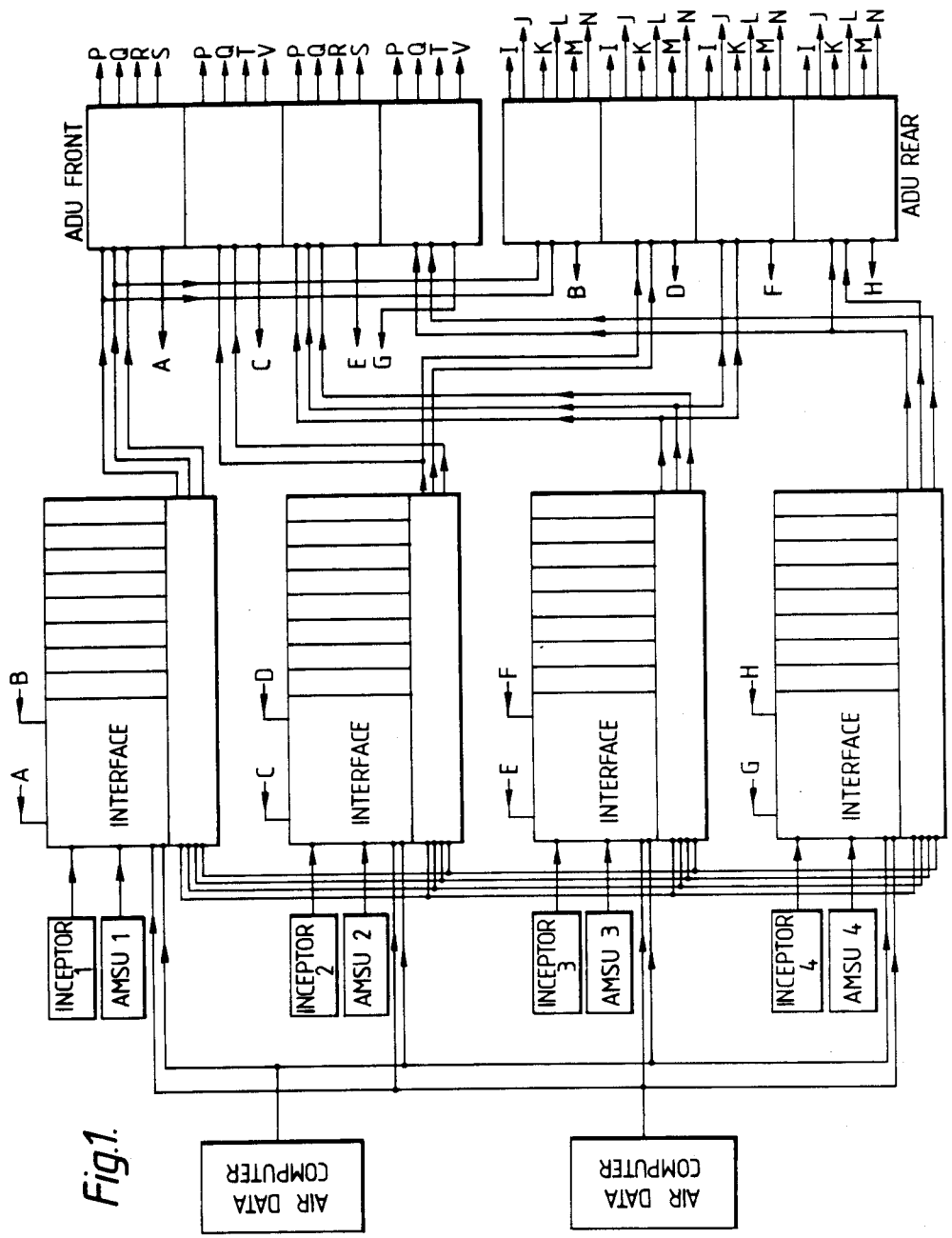
FIG. 1 is a block diagram of a flight control computer system in accordance with the invention.
Figure 4A:
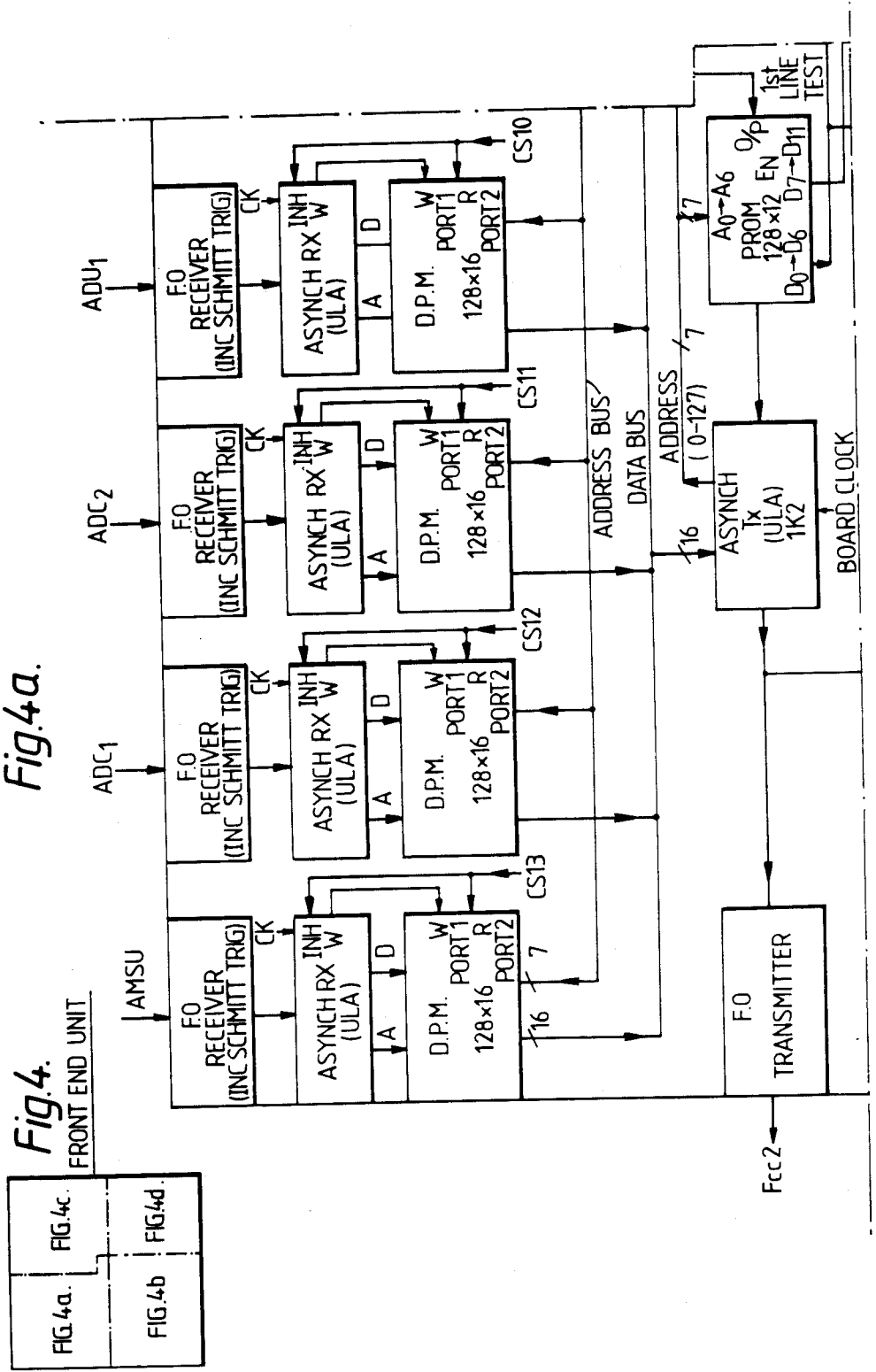
Figure 4B:
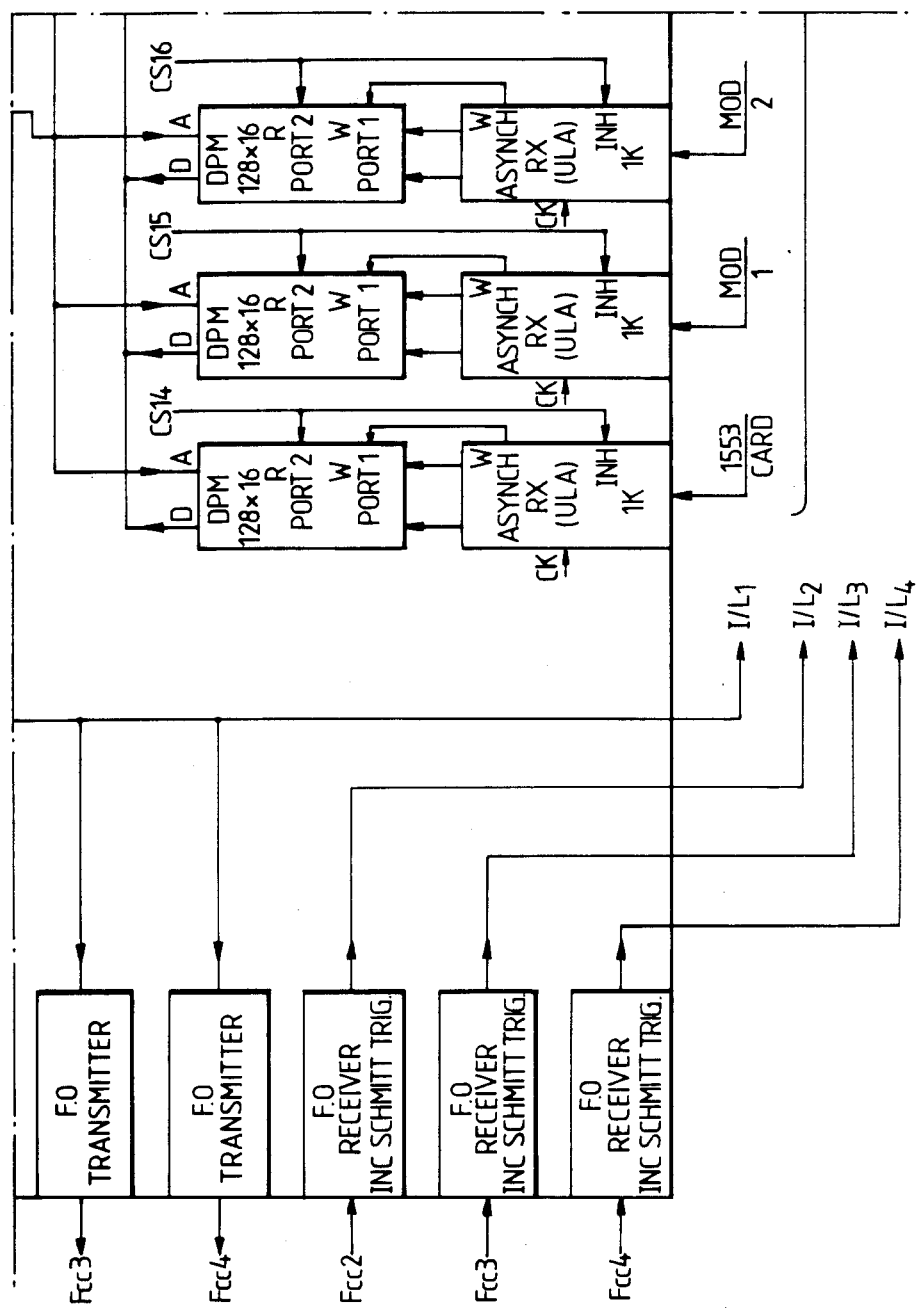
Figure 4C:
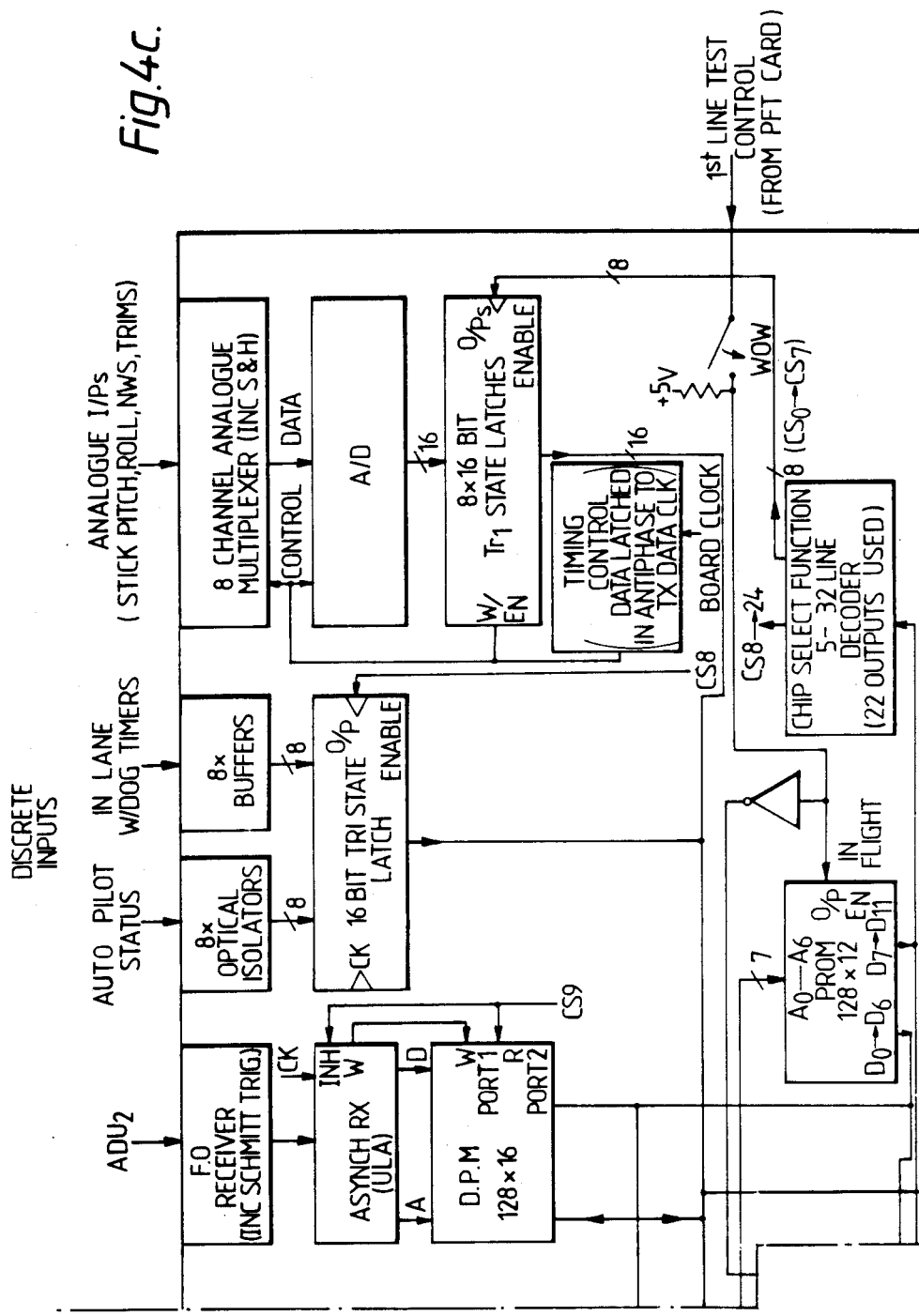
Figure 5:
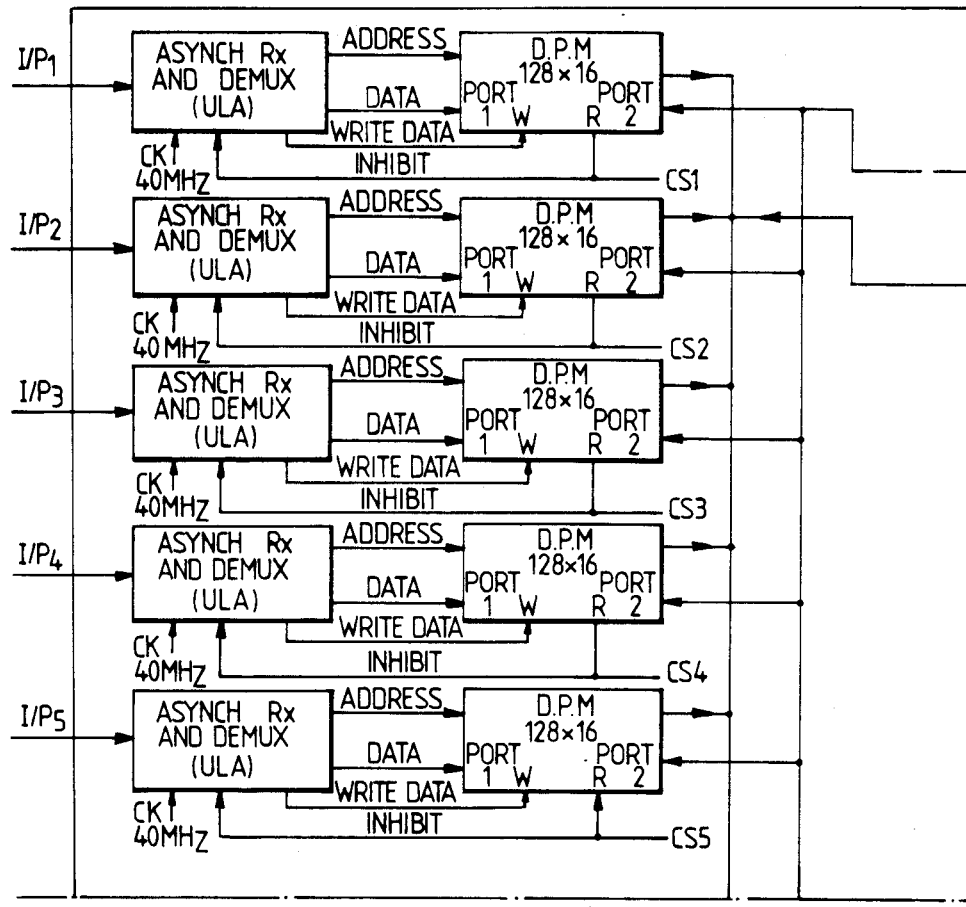
FIGS. 5a–5d are a simplified circuit diagram of a first computing module used in the FIG. 2 computer.
Figure 5A:
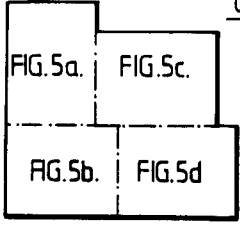
Figure 5B:
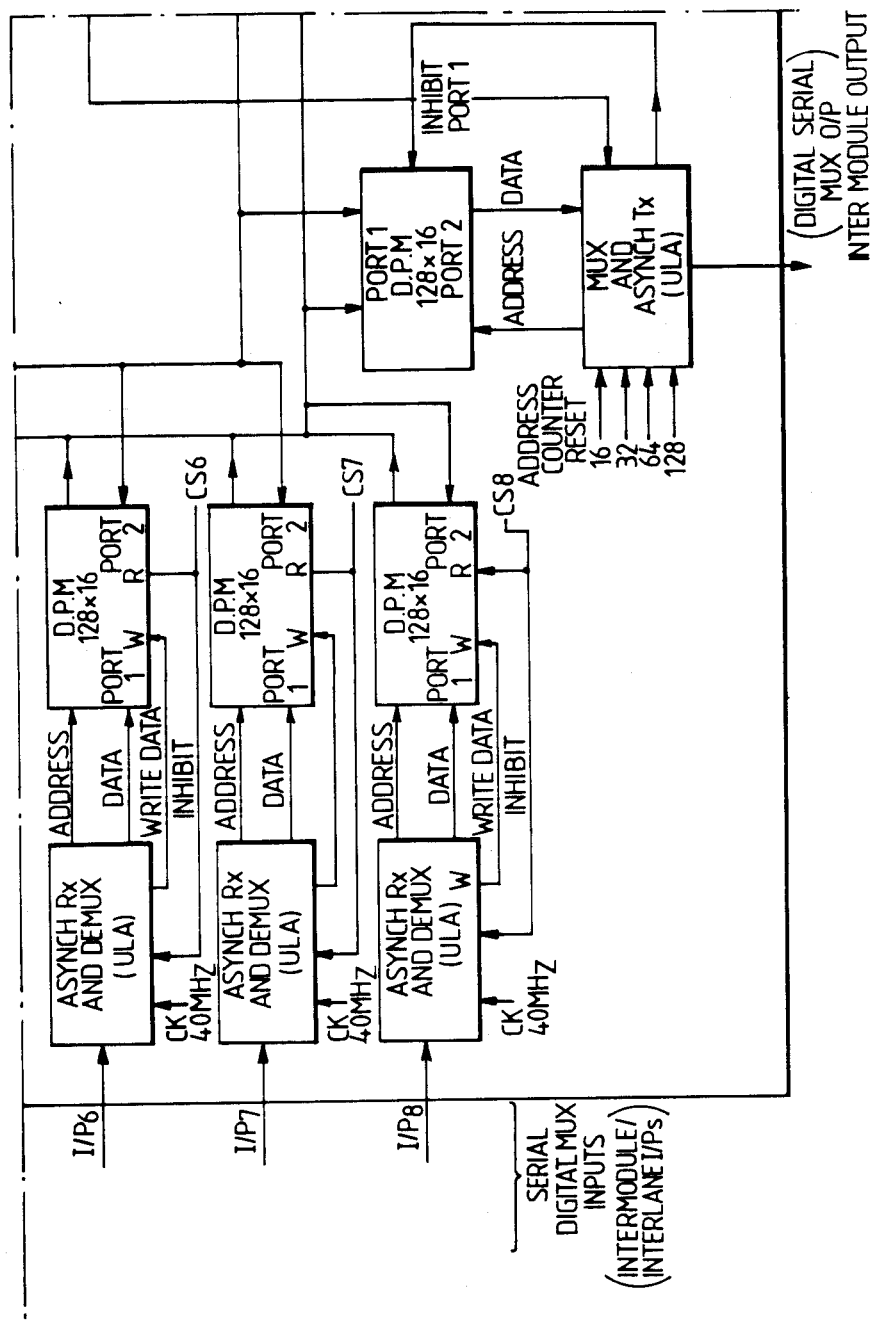
Figure 5C:
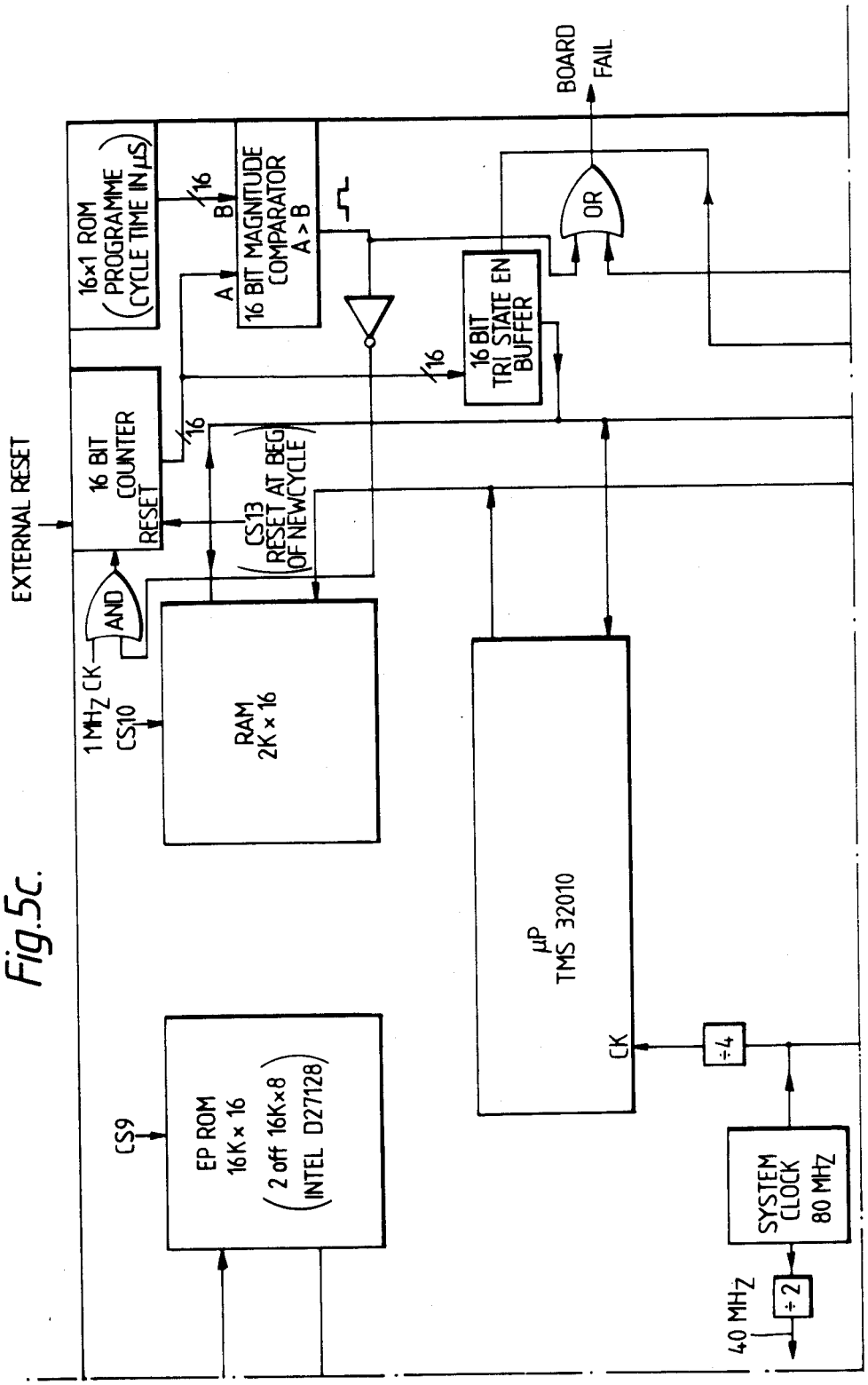

The flight control system shown in FIG. 1 includes four similar control channels or "lanes" L1 to L4 each consisting of ten independent processor modules L1PM1 ... L1PM10, L2PM1 ... L2PM10, ... L4PM1 ... L4PM10 which operate asynchronously in parallel. In each lane, eight of the processor modules are grouped together and with a common front end unit FEU to form a respective one of four flight control computers FCC1 to FCC4. The ninth processor module is physically incorporated with the ninth processor modules of the other lanes into a front actuator monitor and drive assembly MADAF, while the tenth processor modules are physically incorporated with the tenth processor modules of the other lanes into a rear actuator monitor and drive assembly MADAR.

As well as the ninth processor modules L1PM9 to L4PM9, the front actuator monitor and drive assembly MADAF comprises four actuator drive units ADUF1 to ADUF4, one for each processor module. Similarly, the rear monitor and drive assembly MADAR comprises four actuator drive units ADUR1 to ADUR4 incorporated into this assembly. Each actuator drive unit ADUF1 to ADUF4 in the front actuator monitor and drive assembly MADAF is provided with four monitoring and drive ports for respective items to be controlled on board the aircraft, while the actuator drive units ADUR1 to ADUR4 in the rear actuator monitor and drive assembly MADAR has six such ports.

The ports of the front actuator monitor and drive assembly MADAF are coupled, as appropriate for a desired degree of redundancy, to controllable items (not shown) generally towards the front of the aircraft. Thus, in the example shown, each actuator drive unit ADUF1 to ADUF4 may have two of its ports coupled to respective ones of the right and left canard actuators P and Q, thus providing quadruplex control of these items. The other two ports of each of the drive units ADUF1 and ADUF3 are coupled to the nose wheel steering gear R, respectively, and right-hand engine air intake controller S so as to give dual control of each of these items. Meanwhile, the other two ports of each of the drive units ADUF2 and ADUF4 are coupled to the leading edge control surface actuators T and the left-hand engine air intake controller V, again giving dual control of these items.

Similarly, the ports of the rear actuator monitor and drive assembly MADAR are coupled to controllable items (not shown) generally to the rear of the aircraft. Thus, in the example shown, the six ports of each of the actuator units ADUR1 to ADUR4 are coupled to respective ones of six actuators I, J, K, L, M and N for the flaperons and rudder of the aircraft. Incorporation of the modules into four flight control computers and front and rear actuator monitor and drive units may be preferred, but it is not essential. Instead, the modules L1PM9 to L4PM9 and L1PM10 to L4PM10 could be incorporated in the respective flight computers if desired. The actuator drive units could also be combined with the computers whether or not there are computer modules in it, and the drive assemblies MADAF and MADAR could be combined to form one unit while the four flight control computers could be combined into one or two physical units. This physical distribution is all a matter of choice dependent upon the design of the aircraft.

As discussed, the control system is a quadruplex cross-monitored system with each lane running asynchronously. Each computing lane comprises ten independent processing modules running asynchronously in parallel. The control law task is partitioned among seven processors while two are dedicated to actuator monitoring and one to pre-flight testing (PFT). By way of example, each of the processing modules may incorporate a TMS 320 signal processor.

A common strategy is used for both intermodule and interlane communications. This is multiplex serial digital running at 10 Mbits/sec. Each link is single source, multisink, autonomous and fully asynchronous at the transmitter and receivers and buffered with dual port memories. The frame size is selectable up to 128 words. Fiber optic links may be used between lanes and between computers and ADUs (if these are separate units).

The system is designed for sensor cross-monitoring and consolidation. A quadruplex actuator is assumed and this is also cross-monitored. Additional self test facilities are included for pre-flight test and maintenance purposes and for certain in-flight monitoring functions. The architecture of the System allows the actuator drive electronics to be packaged either within the Flight Control Computers or as one or two separate Actuator Drive Units.

A quadruplex system has been assumed—sensors, computers and actuators—except for certain sensors and actuators which are at a lower level of redundancy. There is provision for twelve servo drives per lane. The data bus terminal is included in each computer, but it is assumed two will interface to the avionics buses and two to the general services buses. All computers are identical in hardware and software, any lane dependency being controlled by the aircraft wiring.

The design is based on a number of identical microprocessor processing modules, each of which communicates with other elements of the system using asynchronous serial digital transmission. Each processing module is a stand alone computer operating in parallel with, but asynchronously with respect to, the others. The total computing task is partitioned among the processors, covering control laws, sensor monitoring, actuator monitoring and built-in testing (BIT). Additional hardware is provided for sensor interfaces, actuator drives and data bus interfaces.

The computer comprises three distinct sections, a main computing section and two actuator drive sections. The computing section receives monitoring information from and controls the operation of the actuator drive and monitoring units and provides control surface position demands to the actuator drive sections. It also includes pre-flight test (PFT) and data bus interface functions. Each actuator section provides actuator drive, loop closure and monitoring for up to six actuators. Each section has its own interlane communications and has only fairly restricted communications with the other sections. This allows the actuator drive sections to be divorced from the Flight Control Computers (FCC) and repackaged as one or two separate Actuator Drive Units (ADU) as in FIG. 1 (if the airframe configuration dictated it) without any impact on the system design.

As shown in FIG. 2, the computing section comprises:

(a) A Front End Unit (FEU)

This is a communications node for all sensor information coming into the computer and also for information returned from the ADUs. All data associated with that lane (from Aircraft Motion Sensor Units (AMSU), air data computers and sensors, inceptors and discrete switches) is interfaced in the FEU and combined into a single serial data stream. This is routed to all other lanes and is also available to all the modules in its own computing section.

(b) Processing Modules

Eight processing modules are available in the computing section. One will be dedicated to PFT functions while the others perform control law calculations, including voter/monitors. Each processor iterates its own program at maximum speed, unrelated to any other module. Control law tasks are partitioned between the modules such that the most time critical tasks are performed by lightly loaded processors and hence at the fastest iteration rates. Where appropriate a module's outputs include control surface demands, in addition to their normal routing, the outputs of these modules are taken to the actuator drives.

(c) DATA BUS Module

This module has access to all data in the same way as the processing modules. This data is available for output to the data bus, and data received from the bus is made available to all modules via the FEU.

As shown in FIGS. 3a-3b, the actuator drive sections each comprise:

(a) Six servo drives

These receive the control surface demands from the computing section, interface actuator and surface position pick-offs and provide analog loop closure of first and second stage feedbacks. The demands and pick-off signals are transmitted to the monitor module.

(b) A monitor module

This is a standard processing module. It receives control surface demands and pick-off data from the servo drives, exchanges it with the other three lanes and performs high speed cross-monitoring of the computer outputs, actuators and pick-offs. It controls the actuator shut-off valve and transmits status information back to the computing section via the FEU.

A common communications method is used throughout the system. This is serial digital at 10 Mbits/sec. Each link is single source, multisink, autonomous and fully asynchronous at the transmitter and receivers and is buffered using Dual Port Memories (DPM). In order to meet the different needs of the various links, the frame size is hardware selectable up to 128 words.

Computer Design Communication System

The communications format chosen is common to all communications links within the flight control system. It has been designed to suit all forms of interlane and intermodule communications dictated by the choice of architecture and control law partitioning. An important feature of the communications is the single source, multisink broadcast approach allowing flexibility of design and expansion of the system (if necessary) with no change to format and minimal hardware change to increase data length. The chosen format is an asynchronous digital serial transmission running at 10 Mbits/sec with return to zero coding, buffered at both ends by dual port memory.

Digital phase locked loop (DPLL) technology is used to recover the transmission clock and a unique sequence at the beginning of each data word allows resynching of the recovered clock prior to clocking of any data into the receiver's shift register and data latch. DPLL technology dictates that the receiving circuitry runs at 40 MHz.

To keep throughput times to a minimum, the communication format is tailored to suit each requirement by hardware presetting of the data (frame) length to 16, 32, 64 or 128 words, before recycling. The data may, for example, be coded as follows:

2 Bits: New Word Sequence
7 Bits: Address Code
1 Bits: Address parity
16 Bits: Data
1 Bit: Data parity The inclusion of address coding within the word negates the need for any frame synching and simplifies the facility for the user presetting the data cycle. In addition, the integrity of the communications is improved, and the possibility of incorrect loading of data into DPM is reduced. Any parity errors detected will prevent over writing of data in DPM. Interlane communication may use a 128 bit word length, while the inter-module communications have 16, 32 or 64 word lengths.

The asynchronicity of the system calls for buffering of the communication by DPM. This in turn necessitates assignments of priorities should contentions occur. The clockwork arrangement of the transmission system requires readily available data; therefore, the communications transmitter will always have priority over a microprocessor write command to the DPM in contention.

The Front End Unit (FIGS. 4a–4d)

This unit acts as the communications node for each lane of the system. To obtain data from the outside world, there are five fiber optic receivers taking in digital data streams from the AMSU, ADC1, ADC2, ADU1 and ADU2 outputs. A multiplexer is also provided which receives inputs from pilots controls that are multiplexed to make use of the single analog to digital converter. Finally, sixteen discrete inputs (eight optically isolated) complete the outside world receivers. All these data signals are latched into dual port memory and read out as required by the clockwork interlane communications control circuit.

This consists of a TX ULA with the interval counter reset and set at 128. Instead of the address bus addressing the DPM directly as is the case for the standard communications strategy, it is used to sequentially address the 'in flight' PROM. The data held at each location in this PROM contains the dual port memory sub address and chip select code of each data word to be included in the interlane traffic. Thus, any necessary reconfiguring of the interlane data traffic is easily achieved by programming this PROM, for example.

Additional in-lane data to go out as interlane traffic is catered for by a bank of nine intermodule communication RX ULAs and associated dual port memories. Eight of these are connected to the general purpose computing modules in the lane and the remaining one to the data bus card. Thus, by suitable programming of the 'in flight' PROM, any data word from the intermodule communications network can also be put out as interlane data.

The interlane data is then taken to three fiber optic transmitters, one each for lanes 2, 3 and 4. Incoming interlane data is received by three fiber optic receivers and fed to the back plane as digital serial data transmissions together with its own interlane data as I/L1, I/L2, I/L3 and I/L4.

Another PROM is provided which can be programmed to enable substitution of air data and pilot commands by synthesized data which is put out by the PFT card and then routed onto the interlane traffic in the relevant time slots by this PROM. This enables dynamic testing and automatic surface response testing as necessary for 1st line tests.

Processing Module (FIGS. 5a–5d)

This is configured as a stand-alone computer card. The computing section consisting of a microprocessor (TMS 32010) and host circuitry, $16K \times 16$ EPROM containing power on PFT nad flight resident software and $2K \times 16$ working RAM.

The board clock is an 80 MHz crystal oscillator with divider circuitry as follows:

```
2 = 40 MHz to run RX ULAS
4 = 20 MHz to run TMS 320
8 = 10 MHz to run TX ULAS
```

There are eight RX ULAS and associated dual port memories as dictated by the control law partitioning. In most cases, the backplane patching of these receivers (FIG. 2, FCC Architecture) is configured as four interlane and four inter-module receivers, although any one can behave as inter-module or interlane without any onboard modifications.

Additionally, there are eight discrete inputs and eight discrete outputs, application of which varies with module function. The discrete inputs are clocked through an 8-bit latch and applied to the data bus, and depending upon the TX and DPM configuration, are routed to all other modules requiring the data. On board selection of the address counter reset sets the data frame size and ensures minimum transmission cycle times for the inter-module communications.

Failure management circuitry on the module incorporates a watchdog timer to detect system clock and processor failure. The timer consists of a 16-bit counter controlled by an independent 1 MHz clock giving a timing range of 65.536 mS in 1 second steps. The timer is reset by the microprocessor writing to a specific address (CS13) at the end of each program cycle. The output of this counter is fed to a magnitude comparator which compares it with the $16 \times 1$ ROM output containing the correct board cycle time programmed in seconds. If the timer count exceeds the ROM value, the counter is inhibited and a module fail condition is set. An external reset line is provided to guard against lock up or power up and provides PFT control of the circuit. Dormant failure of the watchdog timer clock is avoided by using the microprocessor to read the counter at two different times within a program cycle. Interrogation of these two values by the processor will produce a module failure which is discrete if the values are identical, indicating a watchdog timer clock failure. This discrete failure will also be set if the ROM check sum test fails during PFT or in flight.

Figure 6A:
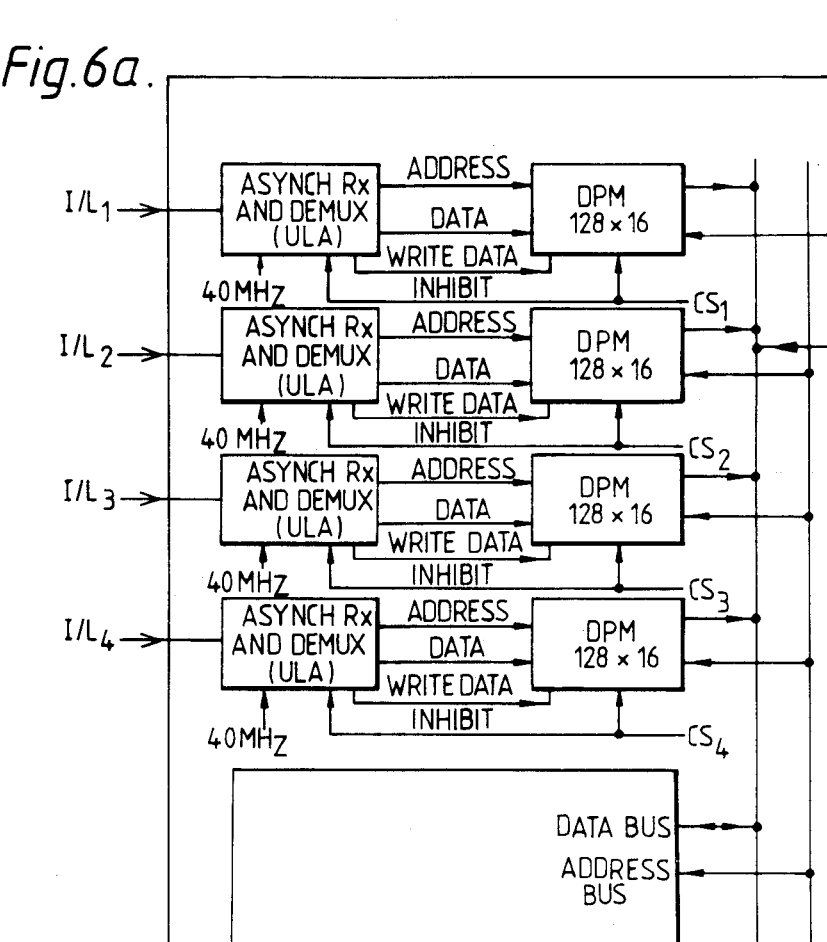
FIGS. 6a–6c are a simplified circuit diagram of a second computing module used in the FIG. 2 computer.
Figure 6:
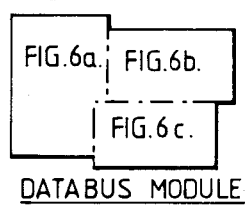
Figure 6B:
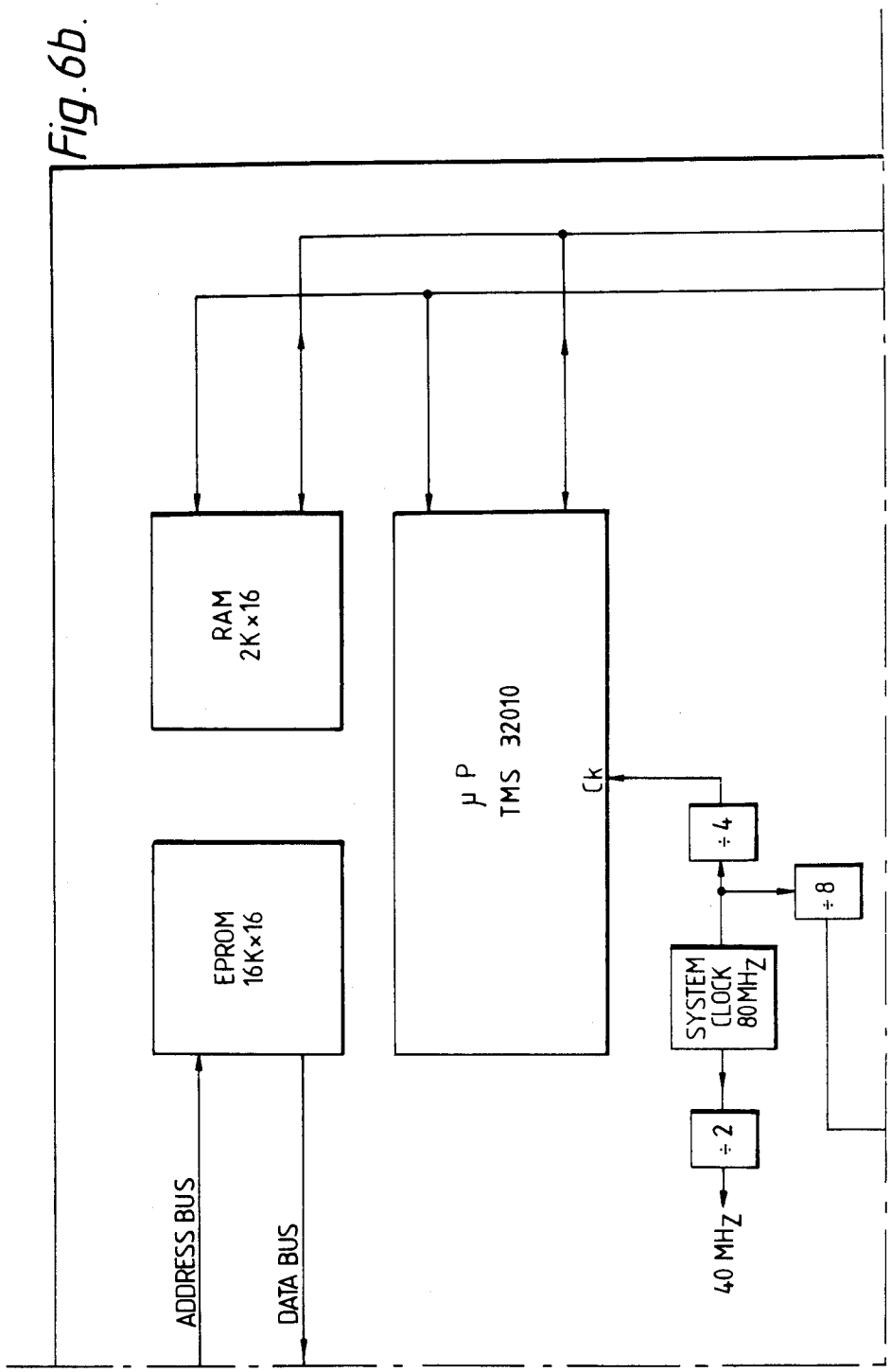
Figure 6C:
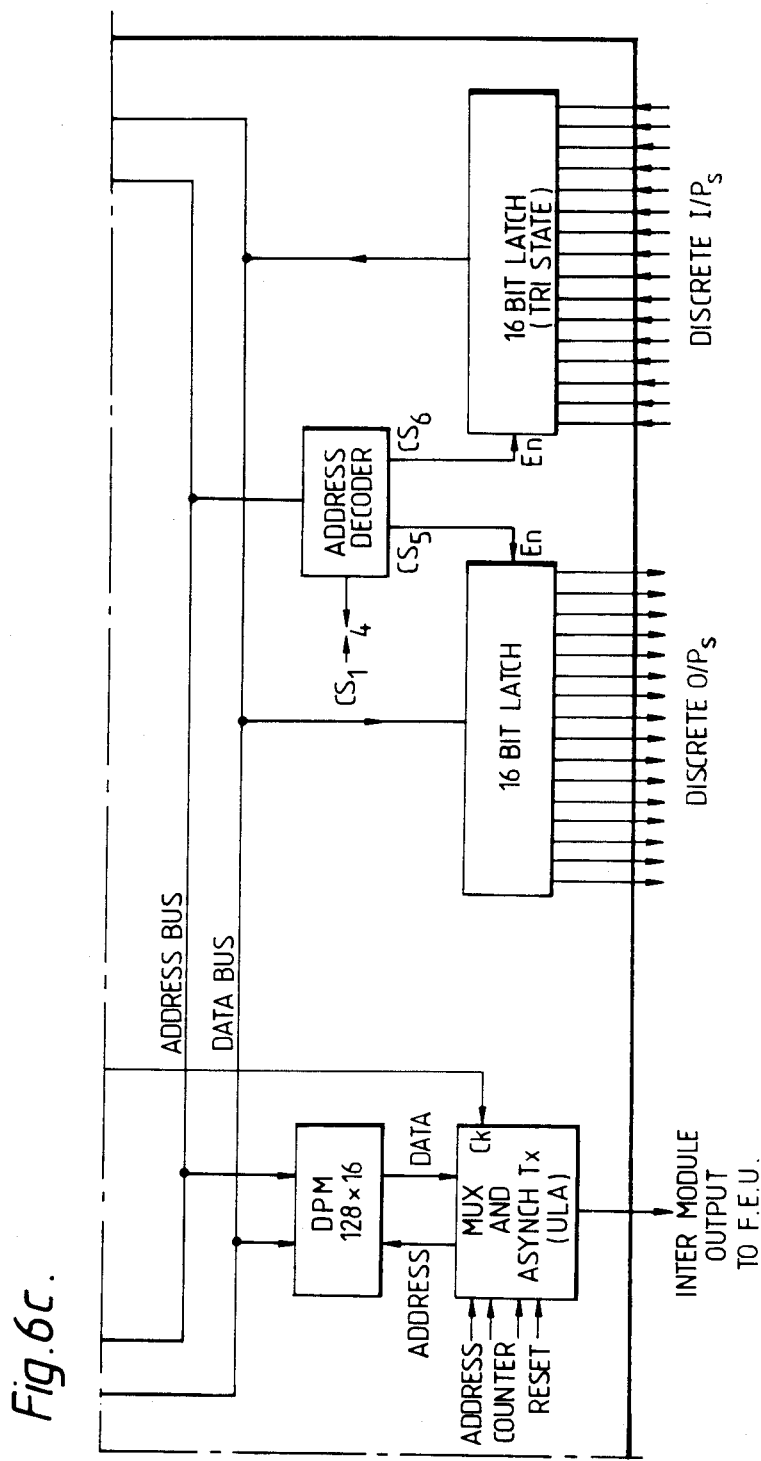

Second Processing Module (FIGS. 6a–6c)

This module provides facilities to collate status and failure information. It interfaces to a Def. Stan. 0018 data bus and to status lights on the pilot's control panels.

The module includes standard module receivers and dual port memory from the four interlane links. Module failure discrete from their watchdog timers are also received at a 16-bit latch. The information is collated by a processor and support circuitry (such as that in the processor of FIG. 5) to produce failure information which may be transmitted onto the associated data bus via a suitable interface and/or used to drive failure warning lights in the cockpit (via a 16 bit latch) if appropriate. Data received from the data bus is transmitted to the FEU to be put onto the interlane traffic by a standard module transmitter.

Figure 7B:
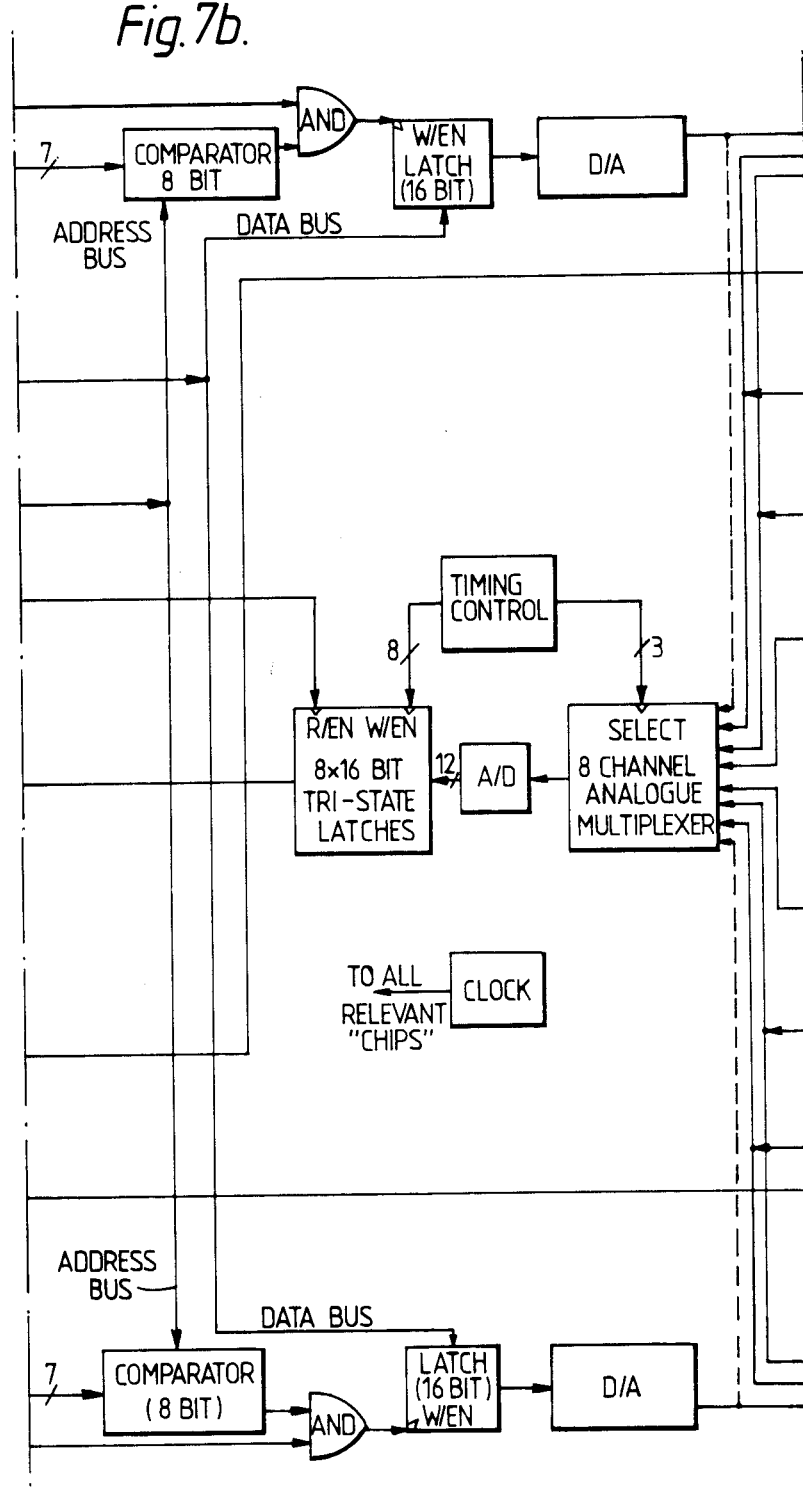
Figure 7C:
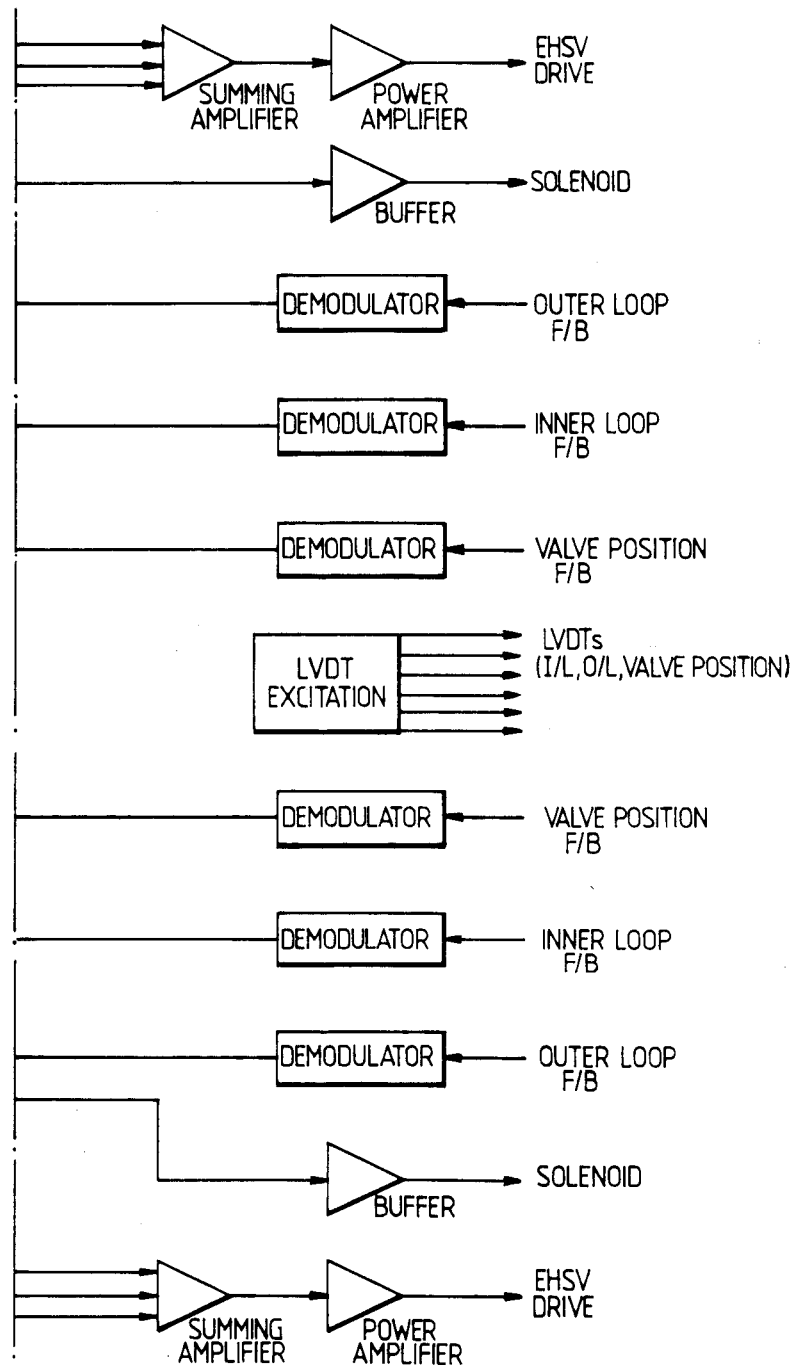

Actuator Drive (FIGS. 7a–7c)

Each actuator drive module provides the system with an interface to two control surface actuators. The drive module receives control surface position demand signals from a single processing module via an asynchronous receiver of the same design as used on the processing modules. The data stream includes the total processing module's output and the actuator drive module includes the means of selecting the correct data. The two addresses (one for each potential drive signal) are held in two 8-bit PROMs. The incoming address is compared with the stored addresses in two 8-bit comparators, and if the received data is valid and the address matches, then it is latched and converted to analog form. The module provides for excitation and demodulation of surface, actuator and servo valve position pick-offs. The actuator and surface position signals are summed with the control surface demand signal in the servo drive amplifier to give analog loop closure.

An 8 channel analog multiplexer is provided for receiving the position and surface demand signals of the two drives, which are multiplexed to the input of a single A/D converter. The digitized outputs are transmitted by a standard asynchronous link to the actuator monitor module.

The drive module also contains the logic and buffering to control the actuators' solenoid valves, driven by discrete outputs from the monitor module. An actuator failure signal from the monitor will cause the appropriate actuator to be isolated, and a monitor failure signal will cause both actuators to be isolated.

We claim:

1. A computer control system for controlling a plurality of actuators, comprising:
    a plurality of actuator drive and monitoring units for forming signals for respectively controlling said actuators and for monitoring the operation of said actuators; and
    a main computing section connected to receive monitoring information, from and to control the operation of, said actuator drive and monitoring units, the main computing section comprising a plurality of computer modules each connected so as to receive and sample asynchronously identical data from at least one of a plurality of sensors, computers, inceptors and switches, the main computing section being operable to share tasks according to work load and task priority, to collectively perform respective control law calculations using the latest values of the asynchronously identical data received, and to provide control surface position demand signals to said actuator drive and monitoring units, each such module comprising a data transmission unit connected to a respective serial data broadcasting line which is in turn connected to a respective data receiving unit in each other module, each data receiving unit including a buffer memory, whereby communication between modules is achieved by any one of said modules broadcasting asynchronous digital data messages including address coding on its data broadcasting line to all other modules and by said one module having a stored address corresponding to the address coding in said message, said message being stored in the buffer memory of said one module for subsequent processing.

2. A computer control system as in claim 1, wherein said plurality of actuators are flight control actuators on board an aircraft, the respective control law calculations including attitude calculations for determining at least one of pitch, roll and yaw of said aircraft.

* * * * *